(12) United States Patent
Zhou et al.

(10) Patent No.: US 10,945,575 B2
(45) Date of Patent: Mar. 16, 2021

(54) ANTI-STATIC VACUUM CLEANER

(71) Applicant: TINECO INTELLIGENT TECHNOLOGY CO., LTD., Suzhou (CN)

(72) Inventors: Dehua Zhou, Suzhou (CN); Zhenhua Zhang, Suzhou (CN); Wenchao Zhu, Suzhou (CN)

(73) Assignee: TINECO INTELLIGENT TECHNOLOGY CO., LTD., Suzhou (CN)

( * ) Notice: Subject to any disclaimer, the term of this patent is extended or adjusted under 35 U.S.C. 154(b) by 354 days.

(21) Appl. No.: 16/085,572

(22) PCT Filed: Mar. 15, 2017

(86) PCT No.: PCT/CN2017/076704
§ 371 (c)(1),
(2) Date: Sep. 15, 2018

(87) PCT Pub. No.: WO2017/157291
PCT Pub. Date: Sep. 21, 2017

(65) Prior Publication Data
US 2019/0029487 A1 Jan. 31, 2019

(30) Foreign Application Priority Data
Mar. 16, 2016 (CN) .......................... 201610149342.9

(51) Int. Cl.
*A47L 9/28* (2006.01)
*A47L 5/26* (2006.01)
*H05F 3/00* (2006.01)

(52) U.S. Cl.
CPC .............. *A47L 9/2889* (2013.01); *A47L 5/26* (2013.01); *A47L 9/2884* (2013.01); *H05F 3/00* (2013.01)

(58) Field of Classification Search
CPC ........ A47L 9/2889; A47L 5/26; A47L 9/2884; H05F 3/00
See application file for complete search history.

(56) References Cited

U.S. PATENT DOCUMENTS

| | | | |
|---|---|---|---|
| 2005/0229556 A1 | 10/2005 | Haberlein | |
| 2012/0079671 A1* | 4/2012 | Stickney | A47L 5/28 15/344 |
| 2015/0113760 A1 | 4/2015 | Fukunaga et al. | |

FOREIGN PATENT DOCUMENTS

| CN | 1426754 A | 7/2003 |
|---|---|---|
| CN | 203000811 U | 6/2013 |

(Continued)

OTHER PUBLICATIONS

European Search Report in Application No. 17765833.3 dated Sep. 23, 2019.

*Primary Examiner* — Andrew A Horton
(74) *Attorney, Agent, or Firm* — Maschoff Brennan

(57) ABSTRACT

An anti-static vacuum cleaner is provided, which comprises a machine body, wherein components on the machine body comprise a suction portion, a main body and a dust collector; the suction portion is communicated with the dust collector arranged on the main body, and a handle is arranged on the main body; the main body is arranged therein with a battery pack which supplies power to the anti-static vacuum cleaner through a power supply line; the components on the machine body at least form a static electricity generating portion, the static electricity generating portion is electrically connected with the handle through the power supply line, and the static electricity generating portion and the handle have no load between access points on the power supply line.

16 Claims, 3 Drawing Sheets

(56) References Cited

FOREIGN PATENT DOCUMENTS

| | | |
|---|---|---|
| CN | 205514403 U | 8/2016 |
| CN | 205612408 U | 10/2016 |
| DE | 197 31 559 A1 | 1/1998 |
| EP | 0 293 802 A2 | 12/1988 |
| EP | 1 570 776 A2 | 9/2005 |
| GB | 2469142 A | 10/2010 |
| JP | 2008106660 A | 5/2008 |
| JP | 2015173673 A | 10/2015 |

* cited by examiner

ANTI-STATIC VACUUM CLEANER

FIELD

The present disclosure is related to an anti-static vacuum cleaner.

BACKGROUND

Static electricity may be produced during operation of vacuum cleaners. On one hand, it may cause damage to the circuit of the whole machine; on the other hand, if it is accumulated excessively, the phenomenon of static strike to hands may occur when a user contacts the machine.

The subject matter claimed herein is not limited to embodiments that solve any disadvantages or that operate only in environments such as those described above. Rather, this background is only provided to illustrate one example technology area where some embodiments described herein may be practiced.

SUMMARY

An anti-static vacuum cleaner may include a machine body and components on the machine body. Components on the machine body may include a suction portion, a main body, and a dust collector, in which: the suction portion is communicated with the dust collector arranged on the main body, and a handle is arranged on the main body; the main body is arranged therein with a battery pack which supplies power to the anti-static vacuum cleaner through a power supply line; the components on the machine body at least form a static electricity generating portion; the static electricity generating portion is electrically connected with the handle through the power supply line; and the static electricity generating portion and the handle have no load between access points on the power supply line.

BRIEF DESCRIPTION OF THE DRAWINGS

Example embodiments will be described and explained with additional specificity and detail through the use of the accompanying drawings in which.

DESCRIPTION OF EXAMPLE EMBODIMENT

Currently, there are mainly two solutions for static electricity elimination on the market: one solution is to reduce the generation amount of static electricity. For example, a non-metal inner pipe may be arranged on the inner wall of a metal pipe, which can reduce the amount of static electricity generated from the friction between dust and the inner wall of the metal pipe. Alternatively, the metal pipe may be replaced with anti-static materials. However, when a great amount of dust is sucked into the vacuum cleaner, these two conventional methods exhibit undesirable effects, as the static phenomenon is still relatively prominent. Another solution is to additionally arrange an independent wire between the metal pipe and the handle. Specifically, the generated static electricity is transferred to a metal ring on the handle via the wire; then, under the action of the contact between the metal ring and a human body, said static electricity is guided into the ground through the human body. For example, Chinese Patent No. CN203000811U discloses an anti-static vacuum cleaner air channel, which comprises a steel sheet that is at least partially exposed outside and electrically connected with a metal expansion pipe and a wired hose. This solution can be achieved theoretically. However, during actual application by a user, as the area of contact between the metal ring and the human body is relatively small, the contact between the metal ring and the human body may be poor, such that the static phenomenon still exists.

Figure 1:
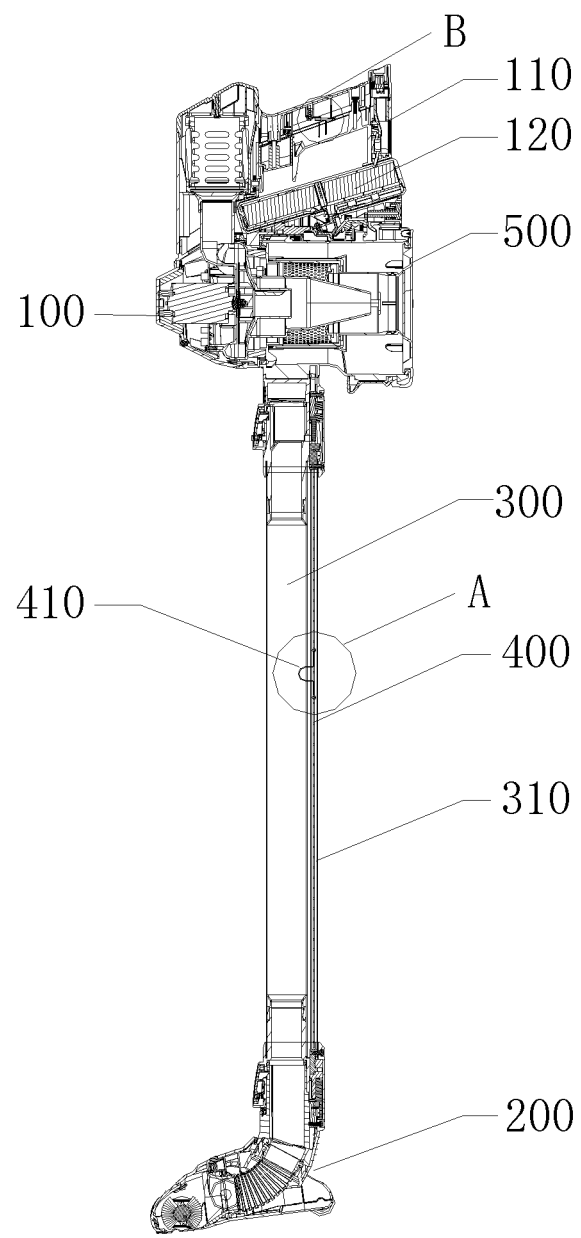
FIG. 1 illustrates a structural schematic diagram of an anti-static vacuum cleaner of the present disclosure.

Aspects of the present disclosure, as described below, address these and other problems with conventional methods and systems. Turning to the figures, FIG. 1 illustrates a structural schematic diagram of an anti-static vacuum cleaner of the present disclosure. As shown in FIG. 1, the anti-static vacuum cleaner of the present disclosure comprises a machine body 100 and a handle 110. During operation of the anti-static vacuum cleaner, a user operates it to collect dust by grasping its handle 110. Components on the machine body 100 comprise a suction portion, a main body 500 and a dust collector, wherein the handle 110 is arranged on the main body 500, and the suction portion is communicated with the dust collector arranged on the main body 500. The anti-static vacuum cleaner of the present disclosure is a battery-driven vacuum cleaner, such as a portable hand-held vacuum cleaner. For example, the main body 500 is arranged therein with a battery pack 120 which supplies power to the anti-static vacuum cleaner through a power supply line 400. The anti-static vacuum cleaner operates at a safety voltage. For example, in this embodiment, a voltage of 22.2 V may be used as the operating voltage. For example, the anti-static vacuum cleaner is powered by six 3.7 V batteries. A vacuum motor is further arranged on the main body 500, and a rolling brush motor is arranged on the suction portion for driving a rolling brush to rotate. During operation of the anti-static vacuum cleaner of the present disclosure, the battery pack 120 supplies power to such electrical apparatuses as the vacuum motor and the rolling brush motor through the power supply line 400, and a dust-containing airflow is sucked up by the suction portion, and then delivered into the dust collector for gas-solid separation. In some embodiments, the suction portion may comprise a floor brush 200 and a metal expansion pipe 300, wherein one end of the metal expansion pipe 300 is connected with the floor brush 200 through a hose. Alternatively, the suction portion is a hose. The specific structure of the suction portion is not limited in the present disclosure, and other example structures of the suction portion are herein contemplated.

Figure 2:
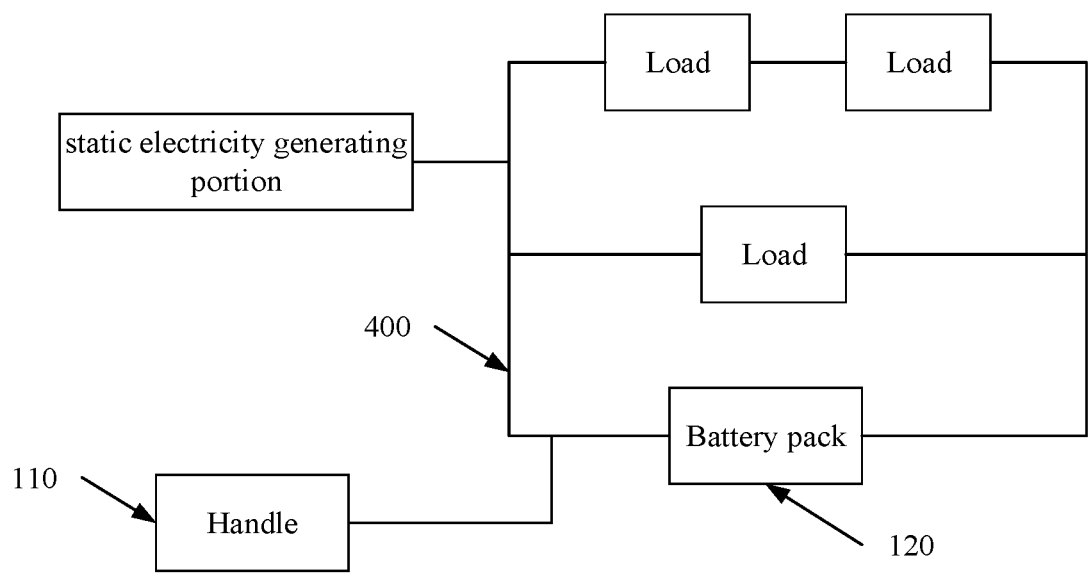
FIG. 2 illustrates a first schematic diagram of access points of a static electricity generating portion and a handle on a power supply line.

As the anti-static vacuum cleaner sucks up dust during operation, static electricity may be generated and accumulated on a plurality of parts thereof. In the present disclosure, the component on the machine body 100 that is prone to generate static electricity is defined as a static electricity generating portion, which may comprise the suction portion, the main body 500, the dust collector, etc. In these or other embodiments, to reduce the influence of static electricity on the anti-static vacuum cleaner, the static electricity generating portion in the present disclosure is electrically connected with the handle 110 through the power supply line 400. Additionally or alternatively, to eliminate or reduce the influence of the power supply line on the human body and to eliminate or reduce the influence of static electricity on electronic elements in the anti-static vacuum cleaner, the static electricity generating portion and the handle 110 have no load between access points on the power supply line 400. For example, the access points of the static electricity generating portion and the handle 110 on the power supply line 400 are located on one wire. For example, FIG. 2 illustrates a first schematic diagram of access points of a static electricity generating portion and a handle on a power supply line. As shown in FIG. 2, the access points of the static electricity generating portion and the handle 110 are located on one wire leading out from one end of the battery pack.

Figure 3:
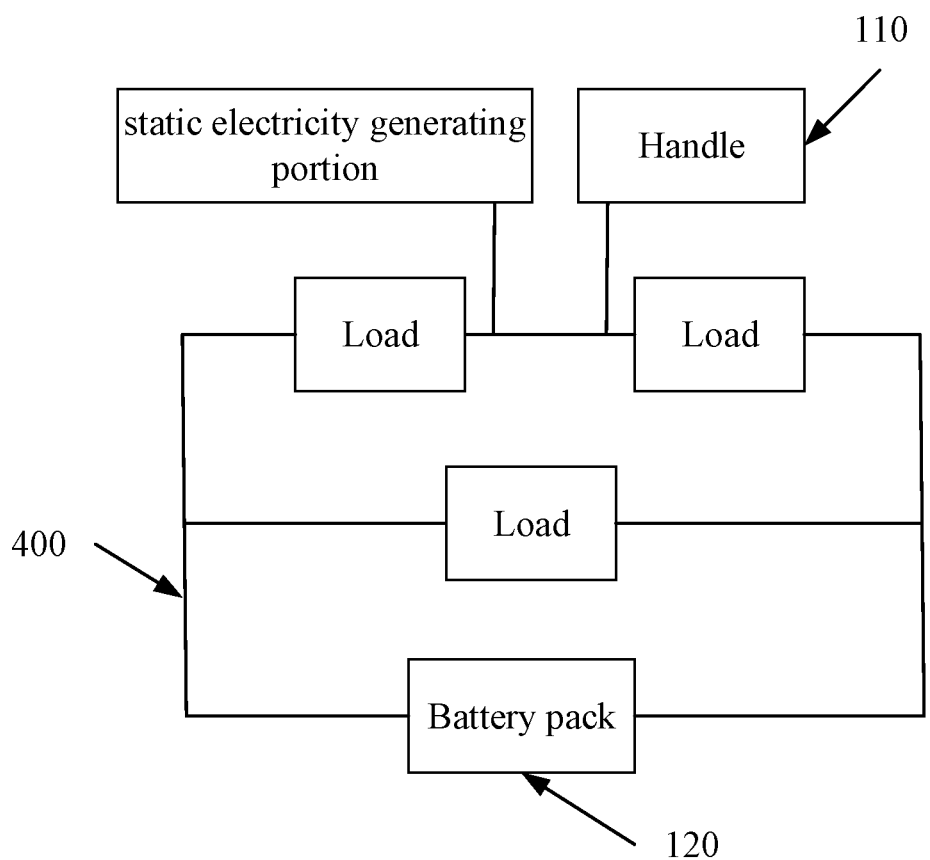
FIG. 3 illustrates a second schematic diagram of access points of the static electricity generating portion and the handle on the power supply line.

FIG. 3 illustrates a second schematic diagram of access points of the static electricity generating portion and the handle on the power supply line. As shown in FIG. 3, the access points of the static electricity generating portion and the handle 110 are located on one wire between two loads. In these or other embodiments, other modes of electric connection may be implemented and are within the scope of the present disclosure. For example, a wire may be welded, on the power supply line 400, to the static electricity generating portion or the handle 110; alternatively, one end of the wire may be directly wound around the power supply line 400, and the other end of the same may be wound around the static electricity generating portion or the handle 110. Other methods for electric connection may also be applied to the present disclosure.

An example is given below for illustration, in which the metal expansion pipe 300 in the suction portion is electrically connected with the handle 110 through the power supply line 400. Other static electricity generating portions may also be electrically connected with the handle 110 in a similar manner. The type of the static electricity generating portions connected electrically with the handle 110 is not specifically limited in the present disclosure. As such, those skilled in the art may conduct designing based on actual requirements, for example, if at least one of the static electricity generating portions is electrically connected with the handle 110.

Figure 4:
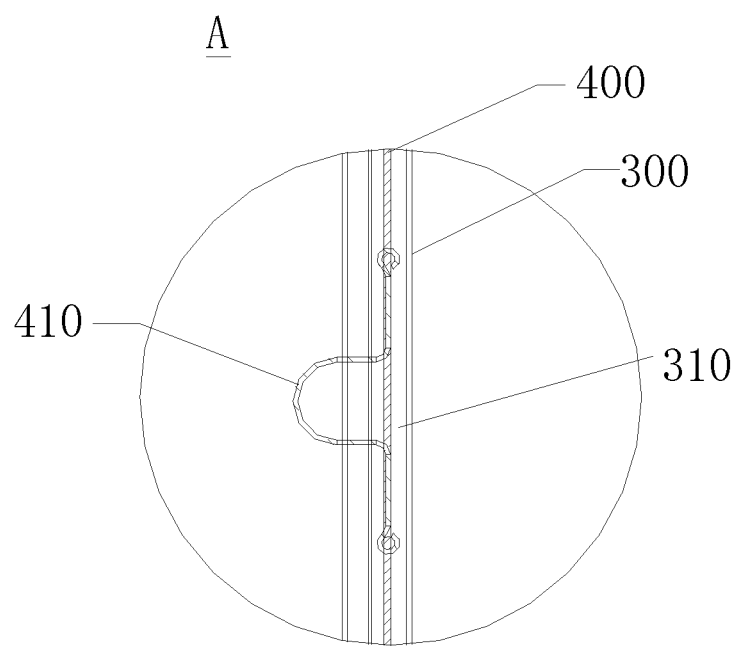
FIG. 4 illustrates an enlarged diagram of the detail indicated by A in FIG. 1.
Figure 5:
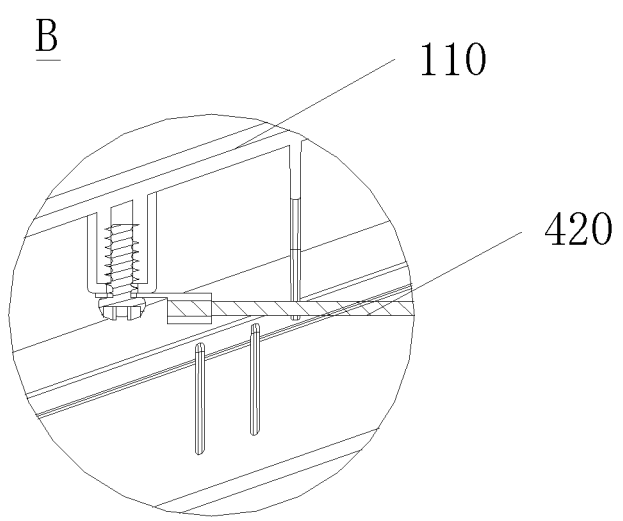
FIG. 5 illustrates an enlarged diagram of the detail indicated by B in FIG. 1.

To facilitate the wiring operation, the anti-static vacuum cleaner is arranged with a recess 310 or a fixing member such as clips for fixing the power supply line 400, wherein the power supply line 400 is fixed in the anti-static vacuum cleaner using the recess 310 or clips. In the case that clips are employed, they may be first mounted on the wiring path of the power supply line 400; then, the power supply line 400 may be clipped into corresponding clips during wiring. FIG. 4 illustrates an enlarged diagram of the detail indicated by A in FIG. 1, and FIG. 5 illustrates an enlarged diagram of the detail indicated by B in FIG. 1. As shown in FIGS. 1, 4 and 5, in these or other embodiments, the metal expansion pipe 300 is arranged therein with a recess 310, and the power supply line 400 connected electrically with the battery pack 120 of the main body 500 electrically connected with the rolling brush motor arranged on the floor brush 200 through the recess 310.

In these or other embodiments, both the power supply line 400 and the metal expansion pipe 300 are manufactured as independent components, and to avoid or reduce an additional increase in the production cost, the metal expansion pipe 300 may be electrically connected with the power supply line 400 through a first metal wire 410, and the power supply line 400 may be electrically connected with the handle 110 through a second metal wire 420. The above metal wires may be connected with the foregoing components via crimping, welding and other processes.

For example, two ends of the first metal wire 410 are bent to be in an annular shape and sleeved on the power supply line 400, and the central portion of the first metal wire 410 is bent to form a protrusion that comes in contact with the metal expansion pipe 300. Additionally or alternatively, one end of the second metal wire 420 is connected with the power supply line 400, while the other end of the same is a connecting end (e.g., a wire nose) that is fixed in the handle 110 via a screw. The structures and connection manners of the above metal wires may be flexible, thereby facilitating the mounting operation.

The manners for electric connection between the handle 110 and the second metal wire 420 may also be diversified. For example, the handle 110 is at least partially formed by a conductive material, wherein the conductive material may be either a metal material or a non-metal material. For instance, the conductive material may be a thermoplastic polyurethane elastomer rubber (electrically conductive TPU) added with such conductive impurities such as metal filings, which may have a resistivity of between about $10^4\Omega$ and about $10^9\Omega$. In these or other embodiments, the electrically conductive TPU having a mark of TPU (K75A) is taken as the conductive material. As compared with the traditional metal conductive sheet, the electrically conductive TPU may increase the area of contact between the conductive material and the human body without affecting the feel of grasping, appearance and safety, thereby ensuring or helping to ensure the efficiency of electrostatic conduction. Alternatively, the handle 110 is arranged thereon with a metal ring, wherein the metal ring is electrically connected with the second metal wire 420.

An example is given below for illustration, in which the dust collector is electrically connected with the handle 110 through the power supply line 400. The dust collector may be made by conductive materials, and the outer wall thereof is arranged with a metal block connected with the dust collector. When the dust collector is mounted to the main body 500, the metal block comes into contact with the metal spring sheet connected with the power supply line 400, such that the dust collector is connected with the power supply line 400. As the power supply line 400 is electrically connected with the handle 110, the above structure can achieve the function of eliminating or reducing static electricity generated by the dust collector.

In these or other embodiments, the static electricity generating portion generates static electricity during operation of the anti-static vacuum cleaner. As it is electrically connected with the handle 110, the static electricity may be transferred to the handle 110 along the power supply line 400, and is then guided into the ground through the human body in a timely manner.

Thus, in some embodiments, to eliminate or reduce static electricity, electrostatic conduction is carried out by utilizing the power supply line in the whole anti-static vacuum cleaner of the present disclosure, and a wire does not need to be independently and additionally arranged, so that the production cost is reduced. Additionally or alternatively, the handle made by conductive materials may include a large contact area with the human body, which, as compared with the traditional metal ring, exhibits more reliable electrostatic conduction.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An anti-static vacuum cleaner, comprising:
   a machine body; and
   components on the machine body including a suction portion, a main body, and a dust collector, wherein:
     the suction portion is communicated with the dust collector arranged on the main body, and a handle is arranged on the main body,
     the main body is arranged therein with a battery pack which supplies power to the anti-static vacuum cleaner through a power supply line,
     the components on the machine body at least form a static electricity generating portion, wherein:
       the static electricity generating portion is electrically connected with the handle through the power supply line, and
       the static electricity generating portion and the handle have no load between access points on the power supply line.

2. The anti-static vacuum cleaner of claim 1, wherein the handle is at least partially formed by a conductive material.

3. The anti-static vacuum cleaner of claim 2, wherein the conductive material is thermoplastic polyurethane elastomer rubber added with conductive impurities.

4. The anti-static vacuum cleaner of claim 3, wherein the power supply line is electrically connected with the at least one static electricity generating portion through a first metal wire, and the power supply line is electrically connected with the handle through a second metal wire.

5. The anti-static vacuum cleaner of claim 3, wherein:
   the power supply line is connected with a metal spring sheet;
   the at least one static electricity generating portion is connected with a metal block; and
   the metal spring sheet comes into contact with the metal block.

6. The anti-static vacuum cleaner of claim 2, wherein the power supply line is electrically connected with the at least one static electricity generating portion through a first metal wire, and the power supply line is electrically connected with the handle through a second metal wire.

7. The anti-static vacuum cleaner of claim 2, wherein:
   the power supply line is connected with a metal spring sheet;
   the at least one static electricity generating portion is connected with a metal block; and
   the metal spring sheet comes into contact with the metal block.

8. The anti-static vacuum cleaner of claim 1, wherein:
   the handle is arranged thereon with a metal ring; and
   the metal ring is electrically connected with the at least one static electricity generating portion through the power supply line.

9. The anti-static vacuum cleaner of claim 8, wherein the power supply line is electrically connected with the at least one static electricity generating portion through a first metal wire, and the power supply line is electrically connected with the handle through a second metal wire.

10. The anti-static vacuum cleaner of claim 8, wherein:
the power supply line is connected with a metal spring sheet;
the at least one static electricity generating portion is connected with a metal block; and
the metal spring sheet comes into contact with the metal block.

11. The anti-static vacuum cleaner of claim 1, wherein:
the suction portion comprises a metal expansion pipe and a floor brush; and
one end of the metal expansion pipe is connected with the floor brush through a hose.

12. The anti-static vacuum cleaner of claim 11, wherein the power supply line is electrically connected with the at least one static electricity generating portion through a first metal wire, and the power supply line is electrically connected with the handle through a second metal wire.

13. The anti-static vacuum cleaner of claim 11, wherein:
the power supply line is connected with a metal spring sheet;
the at least one static electricity generating portion is connected with a metal block; and
the metal spring sheet comes into contact with the metal block.

14. The anti-static vacuum cleaner of claim 1, wherein the power supply line is electrically connected with the at least one static electricity generating portion through a first metal wire, and the power supply line is electrically connected with the handle through a second metal wire.

15. The anti-static vacuum cleaner of claim 14, wherein:
two ends of the first metal wire are bent to be in an annular shape and sleeved on the power supply line, and a central portion of the first metal wire is bent to form a protrusion that comes in contact with the at least one static electricity generating portion; and
one end of the second metal wire is connected with the power supply line, while the other end of the same is a connecting end that is fixed in the handle via a screw.

16. The anti-static vacuum cleaner of claim 1, wherein:
the power supply line is connected with a metal spring sheet;
the at least one static electricity generating portion is connected with a metal block; and
the metal spring sheet comes into contact with the metal block.

* * * * *